(12) United States Patent
Sato et al.

(10) Patent No.: US 11,331,981 B2
(45) Date of Patent: May 17, 2022

(54) ON-BOARD AIR CONDITIONER CONTROL DEVICE, AND VEHICLE

(71) Applicant: MITSUBISHI HEAVY INDUSTRIES THERMAL SYSTEMS, LTD., Tokyo (JP)

(72) Inventors: Hidetaka Sato, Tokyo (JP); Tomoyasu Osaki, Tokyo (JP); Keiji Nagasaka, Tokyo (JP); Ryota Kojima, Tokyo (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 0 days.

(21) Appl. No.: 17/056,596

(22) PCT Filed: Apr. 17, 2019

(86) PCT No.: PCT/JP2019/016455
§ 371 (c)(1),
(2) Date: Nov. 18, 2020

(87) PCT Pub. No.: WO2019/239714
PCT Pub. Date: Dec. 19, 2019

(65) Prior Publication Data
US 2021/0206234 A1    Jul. 8, 2021

(30) Foreign Application Priority Data
Jun. 12, 2018  (JP) .............................. JP2018-111868

(51) Int. Cl.
*B60H 1/22* (2006.01)
*B60H 1/00* (2006.01)
(52) U.S. Cl.
CPC ....... *B60H 1/2215* (2013.01); *B60H 1/00428* (2013.01); *B60H 2001/2256* (2013.01)

(58) Field of Classification Search
CPC ............. B60H 1/2215; B60H 1/00428; B60H 1/2218; B60H 2004/2256; H05B 3/00;
(Continued)

(56) References Cited

U.S. PATENT DOCUMENTS

| 5,495,908 A | * | 3/1996 | Obara | ..................... B60L 50/60 180/65.8 |
| 2009/0146594 A1 | * | 6/2009 | Nakano | ..................... H02P 6/14 318/400.26 |

FOREIGN PATENT DOCUMENTS

| EP | 2 189 734 A2 | 5/2010 |
| JP | 3-43995 A | 2/1991 |

(Continued)

OTHER PUBLICATIONS

International Search Report for International Application No. PCT/JP2019/016455. dated Jun. 18, 2019 with an English translation.
(Continued)

*Primary Examiner* — Emmanuel E Duke
(74) *Attorney, Agent, or Firm* — Birch, Stewart, Kolasch & Birch, LLP

(57) ABSTRACT

This on-board air conditioner control device comprises: a PTC heater which is contained in a high-voltage circuit and generates heat by means of power supplied from a high-voltage battery; a micro-controller which is contained in a low-voltage circuit and controls the power supplied to the PTC heater from the high-voltage battery; a current detection sensor which is contained in the high-voltage circuit and outputs a voltage signal indicating a value for the current flowing through the PTC heater; a V/f conversion unit which is contained in the high-voltage circuit and converts the voltage signal outputted by the current detection sensor to a frequency signal; and a digital isolator which transmits the frequency signal to the micro-controller while preserving electrical insulation between the V/f conversion unit and the micro-controller.

9 Claims, 6 Drawing Sheets

(58) Field of Classification Search
CPC ....... H05B 1/0236; H02P 25/16; B60L 53/22;
B60L 50/60; B60L 1/02; B60R 16/03;
G05D 23/30; B60K 6/46; B60W 20/13;
G01R 31/3835
See application file for complete search history.

(56) References Cited

FOREIGN PATENT DOCUMENTS

| | | |
|---|---|---|
| JP | 6-121404 A | 4/1994 |
| JP | 2009-142049 A | 6/2009 |
| JP | 2014-108770 A | 6/2014 |

OTHER PUBLICATIONS

Written Opinion of the International Searching Authority for International Application No. PCT/2019/016455, dated Jun. 18, 2019 with an English translation.
Japanese Office Action dated Feb. 22, 2022, issued in corresponding JP Application No. 2018-111868 with an English translation.
Linear technology, [online], [retrieved on Feb. 1, 2022], URL: https://www.analog.com/media/jp/technical-documentation/data-sheets/j6990fb.pdf.
Linear technology, [online], Aug. 9, 2010, [retrieved on Feb. 1, 2022], URL: https://www.analog.com/media/jp/news-marketing-collateral/press-releases/itc699x_final_rel_08-09-10jfinal.pdf.

* cited by examiner

ON-BOARD AIR CONDITIONER CONTROL DEVICE, AND VEHICLE

TECHNICAL FIELD

The present invention relates to a vehicle-mounted conditioner control device and a vehicle.

This application claims priority based on Japanese Patent Application No. 2018-111868, filed on Jun. 12, 2018, the content of which is incorporated herein by reference.

BACKGROUND ART

In a technical field of an air conditioner that is mounted in an electric vehicle, a hybrid vehicle, or the like, there is known a vehicle-mounted air conditioner control device that heats a PTC heater by electrical conduction from a high-voltage battery mounted in a vehicle and circulates thus-generated hot water example, see PTL 1).

Such a vehicle-mounted air conditioner control device generally includes a microcontroller, and the microcontroller appropriately controls electrical conduction (heating) to the PTC heater based on a command from a higher-level device and various detection values from sensors.

CITATION LIST

Patent Literature

[PTL 1] Japanese Unexamined Patent Application Publication No. 2014-108770

SUMMARY OF INVENTION

Technical Problem

The above-described vehicle-mounted conditioner control device is divided into a low-voltage system circuit that operates with reception of power supply from a low-voltage battery (a general 12 V vehicle-mounted battery) and a high-voltage system circuit that operates with reception of power supply from a high-voltage battery for motor drive. In order to secure safety, the high-voltage system circuit and the low-voltage system circuit are electrically insulated.

The above-described microcontroller needs to acquire a temperature (water temperature) of water heated by the PTC heater through a water temperature sensor for electrical conduction control to the PTC heater. In order to detect the temperature of water flowing into and out from a main body, the water temperature sensor is attached to a housing frame that serves as a ground of the low-voltage system circuit. Here, in a case where the water temperature sensor is connected to the high-voltage system circuit, the housing frame (the ground of the low-voltage system circuit) and a ground of the high-voltage system circuit are closely connected through the water temperature sensor. For this reason, it may not be possible to sufficiently secure a withstand voltage between the high-voltage system circuit and the low-voltage system circuit. Accordingly, from a viewpoint of preventing degradation of insulation performance, it is preferable that the water temperature sensor is connected to the low-voltage system circuit.

The microcontroller is also disposed on the low-voltage system circuit side along with the water temperature sensor, whereby it is possible to directly connect the microcontroller and the water temperature sensor. However, the microcontroller needs to further acquire a value of a voltage output from the high-voltage battery or a current flowing from the high-voltage battery to the PTC heater for electrical conduction control into the PTC heater. In a case where the microcontroller is connected to the low-voltage system circuit, it is hard to acquire the value of the voltage output from the high-voltage battery or the current flowing in the PTC heater while maintaining insulation with the high-voltage system circuit.

The invention provides a vehicle-mounted air conditioner control device and a vehicle capable of solving the above-described problem.

Solution to Problem

According to an aspect of the invention, there is provided a vehicle-mounted air conditioner control device including a heater element that is included in a high-voltage system circuit and generates heat by power supplied from a high-voltage battery, a microcontroller that is included in a low-voltage system circuit and controls the power supplied from the high-voltage battery to the heater element, a current detection sensor that is included in the high-voltage system circuit and outputs a voltage signal indicating a value of a current flowing in the heater element, a V/f conversion unit for current detection that is included in the high-voltage system circuit and converts the voltage signal output from the current detection sensor into a frequency signal, and a digital isolator for current detection that transmits the frequency signal to the microcontroller while maintaining electrical insulation between the V/f conversion unit for current detection and the microcontroller.

According to the aspect of the invention, the V/f conversion unit for current detection includes a silicon oscillator having a setting terminal and an output terminal, and the silicon oscillator outputs, from the output terminal, the frequency signal having a frequency corresponding to a current output from the setting terminal.

According to the aspect of the invention, the vehicle-mounted air conditioner control device further includes a high-voltage-side voltage sensor that is included in the high-voltage system circuit and outputs a voltage signal according to an input voltage from the high-voltage battery, a V/f conversion unit for high-voltage-side voltage detection that is included in the high-voltage system circuit and converts the voltage signal output from the high-voltage-side voltage sensor into a frequency signal, and a digital isolator for high-voltage-side voltage detection that transmits the frequency signal to the microcontroller while maintaining electrical insulation between the V/f conversion unit for high-voltage-side voltage detection and the microcontroller.

According to another aspect of the invention, there is provided a vehicle-mounted air conditioner control device including a motor that is included in a high-voltage system circuit and is driven with power supplied from a high-voltage battery, a microcontroller that is included in a low-voltage system circuit and controls the power supplied from the high-voltage battery to the motor, a current detection sensor that is included in the high-voltage system circuit and outputs a voltage signal indicating a value of a current flowing in the motor, a V/f conversion unit for current detection that is included in the high-voltage system circuit and converts the voltage signal output from the current detection sensor into a frequency signal, and a digital isolator for current detection that transmits the frequency signal to the microcontroller while maintaining electrical insulation between the V/f conversion unit for current detection and the microcontroller.

According to another aspect of the invention, there is provided a vehicle including the above-described vehicle-mounted air conditioner control device.

Advantageous Effects of Invention

With the vehicle-mounted air conditioner control device and the vehicle described above, it is possible to sufficiently secure a withstand voltage between the low-voltage system circuit and the high-voltage system circuit.

DESCRIPTION OF EMBODIMENTS

First Embodiment

Hereinafter, a vehicle-mounted air conditioner control device according to a first embodiment will be described referring to FIGS. 1 to 5.
(Overall Configuration of Vehicle-Mounted Air Conditioner Control Device)

Figure 1:
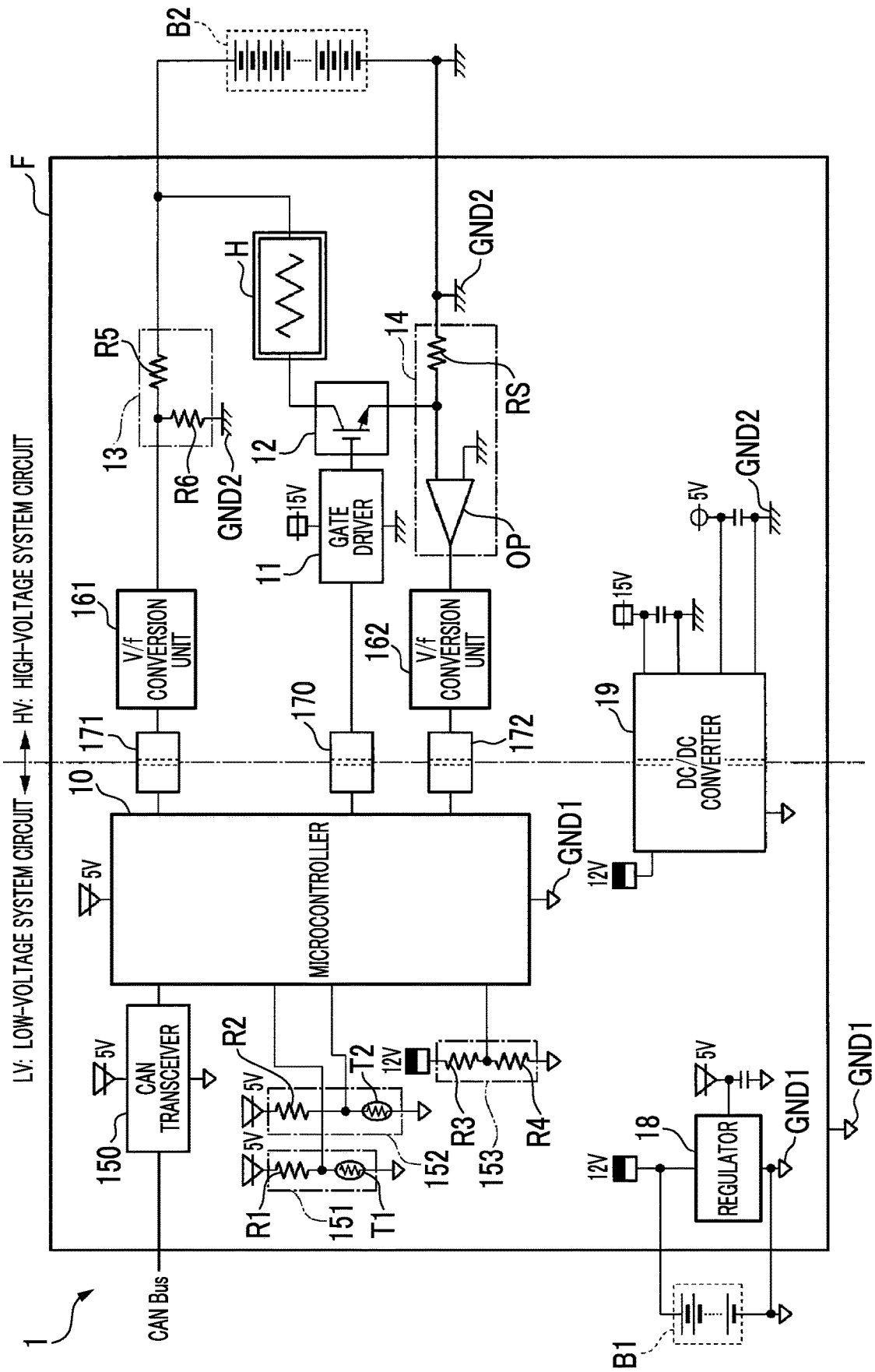
FIG. 1 is a diagram showing the overall configuration of a vehicle-mounted air conditioner control device according to a first embodiment.

FIG. 1 is a diagram showing the overall configuration of the vehicle-mounted air conditioner control device according to the first embodiment.

A vehicle-mounted air conditioner control device 1 shown in FIG. 1 is an air conditioner control device that is mounted in a vehicle, such as an electric vehicle or a hybrid vehicle. The vehicle-mounted air conditioner control device 1 makes a PTC heater H, which is a so-called hot water PTC heater, generate heat through electrical conduction from a high-voltage battery B2 (a high-voltage battery for motor drive) mounted in an electric vehicle, a hybrid vehicle, or the like, and generates hot water necessary for in-vehicle air conditioning.

As shown in FIG. 1, the vehicle-mounted air conditioner control device 1 has a low-voltage system circuit LV and a high-voltage system circuit HV. A ground GND1 of the low-voltage system circuit LV and a ground GND2 of the high-voltage system circuit HV are insulated. The ground GND1 of the low-voltage system circuit LV is electrically connected to a housing frame F. A low-voltage battery B1 (for example, a DC 12 V output vehicle-mounted battery) that is mounted in the vehicle is connected to the low-voltage system circuit LV. A high-voltage battery B2 (for example, a DC 300 V output vehicle-mounted battery) that is mounted in the vehicle is connected to the high-voltage system circuit HV. The high-voltage battery B2 is a main power supply source for rotationally driving a motor for vehicle drive.

The high-voltage system circuit HV of the vehicle-mounted air conditioner control device 1 includes a gate driver 11, a switching element 12, a high-voltage-side voltage sensor 13, a current detection sensor 14, and V/f conversion units 161 and 162. The low-voltage system circuit LV of the vehicle-mounted air conditioner control device 1 includes a microcontroller 10, a CAN transceiver 150, an inlet-side water temperature sensor 151, an outlet-side water temperature sensor 152, a low-voltage-side voltage sensor 153, and a regulator 18.

The vehicle-mounted air conditioner control device 1 includes digital isolators 170, 171, and 172 and a DC/DC converter 19 that are disposed over the boundary between the low-voltage system circuit LV and the high-voltage system circuit HV.

Hereinafter, various circuit, configurations included in the high-voltage system circuit HV will be described in detail.

The gate driver 11 controls the on and off of the switching element 12 based on a control signal (digital signal) from the microcontroller 10 described below. The gate driver 11 drives with a power supply voltage of DC 15 V. A ground terminal of the gate driver 11 is connected to the ground GND2 of the high-voltage system circuit HV.

The digital isolator 170 disposed between the gate driver 11 and the microcontroller 10 will be described below.

The switching element 12 is a high-withstand voltage semiconductor switching element (so-called power transistor), and is, for example, an insulated gate bipolar transistor (IGBT) or the like. The switching element 12 is controlled to be on and off based on a gate signal from the gate driver 11. When the switching element 12 is ON, a current flows from the high-voltage battery B2 (DC 300 V) to the PTC heater H, and the PTC heater H is heated.

The high-voltage-side voltage sensor 13 is a sensor that detects the input voltage from the high-voltage battery B2. Specifically, the high-voltage-side voltage sensor 13 is a voltage divider that has resistive elements R5 and R6. The input voltage (for example, DC 300 V) from the high-voltage battery B2 is divided by the high-voltage-side voltage sensor 13 (voltage divider). With such a configuration, the high-voltage-side voltage sensor 13 outputs a voltage signal (analog signal) corresponding to the input voltage from the high-voltage battery B2 toward the microcontroller 10.

The V/f conversion unit 161 and the digital isolator 171 disposed between the high-voltage-side voltage sensor 13 and the microcontroller 10 will be described below.

The current detection sensor 14 is a sensor that detects a value of a current (hereinafter, referred to as a "heater current") flowing in the PTC heater H. Specifically, the current detection sensor 14 has a resistive element RS that is a shunt resistor, and an amplifier OP. With such a current detection sensor 14, a voltage drop occurs in the resistive element RS according to the value of the heater current. Then, a voltage signal (analog signal) generated by amplifying the voltage drop in the resistive element RS with the amplifier OP is output toward the microcontroller 10.

The V/f conversion unit 162 and the digital isolator 172 disposed between the current detection sensor 14 and the microcontroller 10 will be described below.

The PTC heater H is a heater element, that generates heat by power supplied from the high-voltage battery B2.

The V/f conversion unit 161 (a V/f conversion unit for high-voltage-side voltage detection) receives the voltage signal (analog signal) output from the high-voltage-side voltage sensor 13 and converts the voltage signal into a frequency signal that oscillates at a frequency corresponding to the voltage signal.

The V/f conversion unit 162 (a V/f conversion unit for current detection) converts the voltage signal (analog signal) output from the current detection sensor 14 into a frequency signal.

Next, various circuit configurations included in the low-voltage system circuit LV will be described in detail.

The microcontroller 10 is a processor that controls the entire operation of the vehicle-mounted air conditioner control device 1. The microcontroller 10 executes various kinds of processing in compliance with a program prepared in advance. Specifically, the microcontroller 10 controls electrical conduction to the PTC heater H based on a command value (a target water temperature or the like) received from a higher-level device, detection results of an inlet temperature and an outlet temperature of hot water heated by the PTC heater H, and the like. In this case, the microcontroller 10 appropriately performs adjustment while monitoring the value of the heater current at the present time.

The microcontroller 10 continuously monitors an input voltage from the low-voltage battery B1 and an input voltage from the high-voltage battery B2, and performs abnormality detection and the like for the low-voltage battery B1 and the high-voltage battery B2.

As shown in FIG. 1, the microcontroller 10 is driven with a power supply voltage of DC 5 V based on the ground GND1. A ground terminal of the microcontroller 10 is connected to the ground GND1 of the low-voltage system circuit LV.

The CAN transceiver 150 is connected to a CAN bus, and realizes bi-directional communication between the higher-level device (not shown), to which the CAN transceiver 150 is connected through the CAN bus, and the microcontroller 10. The CAN transceiver 150 transmits, for example, the command value from the higher-level device to the microcontroller 10.

The CAN transceiver 150 is driven with a power supply voltage of DC 5 V based on the ground GND1. A ground terminal of the CAN transceiver 150 is connected to the ground GND1 of the low-voltage system circuit LV.

Each of the inlet-side water temperature sensor 151 and the outlet-side water temperature sensor 152 is a temperature sensor that detects the temperature of hot water heated by the PTC heater H. Specifically, the inlet-side water temperature sensor 151 is provided near an inlet of a flow path (not shown) of hot water in the housing frame F and detects a hot water inlet temperature. The outlet-side water temperature sensor 152 is provided near an outlet of the flow path of hot water in the housing frame F and detects a hot water outlet temperature.

The inlet-side water temperature sensor 151 and the outlet-side water temperature sensor 152 are driven with the power supply voltage of DC 5 V based on the ground GND1. Ground terminals of the inlet-side water temperature sensor 151 and the outlet-side water temperature sensor 152 are connected to the ground GND1 of the low-voltage system circuit LV.

The inlet-side water temperature sensor 151 has a resistive element R1 and a temperature sensor element T1 that are connected in series between the power supply and the ground. The temperature sensor element T1 becomes a resistance value corresponding to a detected temperature.

With such a configuration, the inlet-side water temperature sensor 151 outputs a voltage signal (analog signal) according to the inlet temperature.

The outlet-side water temperature sensor 152 has a resistive element R2 and a temperature sensor element T2 that are connected in series between the power supply and the ground. The temperature sensor element T2 becomes a resistance value corresponding to the detected temperature. With such a configuration, the outlet-side water temperature sensor 152 outputs a voltage signal (analog signal) according to the outlet temperature.

The low-voltage-side voltage sensor 153 is a sensor that detects the input voltage from the low-voltage battery B1. Specifically, the low-voltage-side voltage sensor 153 is a voltage divider that has resistive elements R3 and R4. The input voltage (for example, DC 12 V) from the low-voltage battery B1 is divided by the low-voltage-side voltage sensor 153 (voltage divider). With such a configuration, the low-voltage-side voltage sensor 153 outputs a voltage signal (analog signal) corresponding to the input voltage from the low-voltage battery B1.

A ground terminal of the low-voltage-side voltage sensor 153 is connected to the ground GND1 of the low-voltage system circuit LV.

Each of the digital isolators 170, 171, 172 is, for example, a photocoupler, and is an element that enables transmission of a digital signal input from a primary side to a secondary side or a digital signal input from the secondary side to the primary side while maintaining electrical insulation between the primary side (low-voltage system circuit LV) and the secondary side (high-voltage system circuit HV).

The digital isolator 170 transmits the digital signal output from the microcontroller 10 to the gate driver 11 while maintaining electrical insulation between the microcontroller 10 and the gate driver 11.

The digital isolator 171 (a digital isolator for high-voltage-side voltage detection) transmits the frequency signal output from the V/f conversion unit 161 to the microcontroller 10 while maintaining electrical insulation between the V/f conversion unit 161 and the microcontroller 10.

The digital isolator 172 (a digital isolator for current detection) transmits the frequency signal output from the V/f conversion unit 162 to the microcontroller 10 while maintaining electrical insulation between the V/f conversion unit 162 and the microcontroller 10.

The regulator 13 outputs, based on the input voltage (for example, DC 12 V) from the low-voltage battery B1, a constant voltage (for example, DC 5 V) lower than the input voltage. The constant voltage generated by the regulator 18 becomes a power supply voltage of the CAN transceiver 150, the inlet-side water temperature sensor 151, the outlet-side water temperature sensor 152, and the like belonging to the low-voltage system circuit LV.

The DC/DC converter 19 is a so-called insulation type DC/DC converter, and converts a DC voltage input from the primary side into a desired DC voltage and outputs the converted DC voltage to the secondary side while maintaining electrical insulation between the primary side (low-voltage system circuit LV) and the secondary side (high-voltage system circuit HV). Specifically, the DC/DC converter 19 is input with the voltage (for example, DC 12 V) from the low-voltage battery B1 based on the ground GND1 of the primary side (low-voltage system circuit LV) and converts the voltage into a constant voltage (for example, DC 5 V, DC 15 V) based on the ground GND2 of the secondary side (high-voltage system circuit HV). The constant voltage generated by the DC/DC converter 19 becomes a power supply voltage of the gate driver 11 and the like belonging to the high-voltage system circuit HV.

(Circuit Configuration and Function of V/f Conversion Unit for Current Detection)

Figure 2:
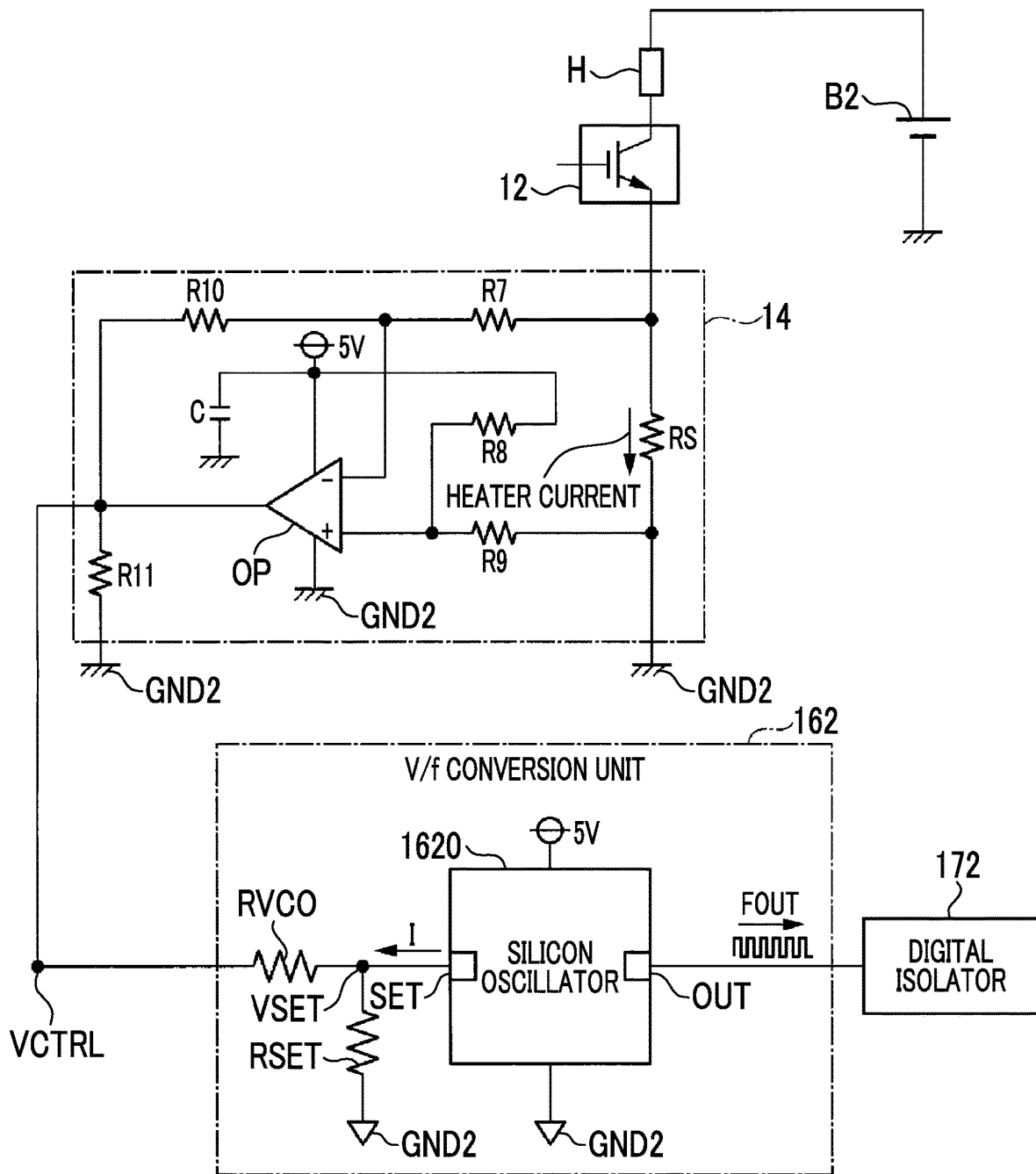
FIG. 2 is a first view showing the detailed circuit configuration of a V/f conversion unit according to the first embodiment.

FIG. 2 is a first view showing the detailed circuit configuration of the V/f conversion unit according to the first embodiment.

Figure 3:
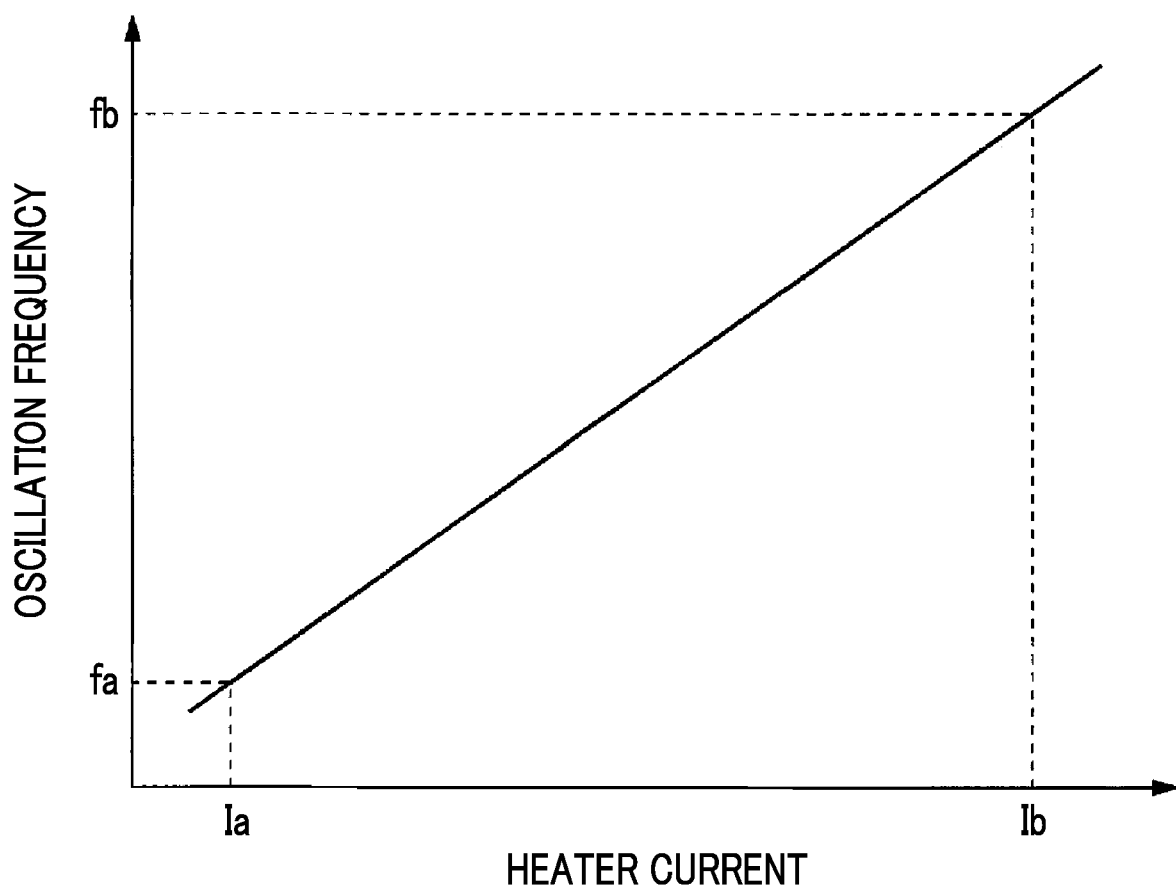
FIG. 3 is a first view illustrating a function of the V/f conversion unit according to the first embodiment.

FIG. 3 is a first view illustrating the function of the V/f conversion unit according to the first embodiment.

Hereinafter, the circuit configuration and the function of the V/f conversion unit 162 (V/f conversion units for current detection) will be described in detail referring to FIGS. 2 and 3. FIG. 2 shows the high-voltage battery B2, the switching element 12, the PTC heater H, the current detection sensor 14 (the resistive element RS, the amplifier OP, resistive elements R7 to R11, and a capacitive element C) in addition to the circuit configuration of the V/f conversion unit 162. The amplifier OP, the resistive elements R7 to R11, and the capacitive element C constitute an inverting amplification circuit.

As shown in FIG. 2, the V/f conversion unit 162 has a silicon oscillator 1620 and resistive elements RVCO and RSET. The silicon oscillator 1620 is input with a power supply voltage DC 5 V based on the ground GND2 and is grounded to the ground GND2.

The silicon oscillator 1620 has a setting terminal SET and an output terminal OUT. The setting terminal SET of the silicon oscillator 1620 allows a current I to flow such that a potential of a setting node VSET connected to the terminal is fixed at a predetermined value. Then, the output terminal OUT of the silicon oscillator 1620 outputs a frequency signal FOUT having a frequency according to a value of the current I flowing from the setting terminal SET.

A resistive element RVCO is connected between the setting node VSET and an output node VCTRL from which the voltage signal (analog signal) according to the heater current is output. A resistive element RSET is connected between the setting node VSET and the ground GND1.

According to the configuration described above, as shown in FIG. 3, for example, in a case where the value of the heater current is a relatively low current value Ia, the voltage drop that occurs in the resistive element RS as a shunt resistor becomes small, and the potential of the output node VCTRL that becomes the output of the inverting amplification circuit including the amplifier OF is raised. Thus, in order to maintain a predetermined potential on the setting node VSET, there is a need to allow a relatively small current I to flow from the setting terminal SET. Accordingly, in this case, the silicon oscillator 1620 outputs the frequency signal FOUT having a relatively low frequency fa from the output terminal OUT.

On the other hand, as shown in FIG. 3, in a case where the amount of the heater current is a relatively high current value Ib, the voltage drop that occurs in the resistive element RS becomes large, and the potential of the output node VCTRL that becomes the output of the inverting amplification circuit including the amplifier OP is lowered. Thus, in order to maintain a predetermined potential on the setting node VSET, there is a need to allow a relatively large current I to flow from the setting terminal SET. Accordingly, in this case, the silicon oscillator 1620 outputs the frequency signal FOOT having a relatively high frequency fb from the output terminal OUT.

With the relationship shown in FIG. 3, the microcontroller 10 can ascertain the value of the heater current through an oscillation frequency of the frequency signal FOUT input by way of the digital isolator 172.

(Circuit Configuration and Function of V/f Conversion Unit for High-Voltage-Side Voltage Detection)

Figure 4:
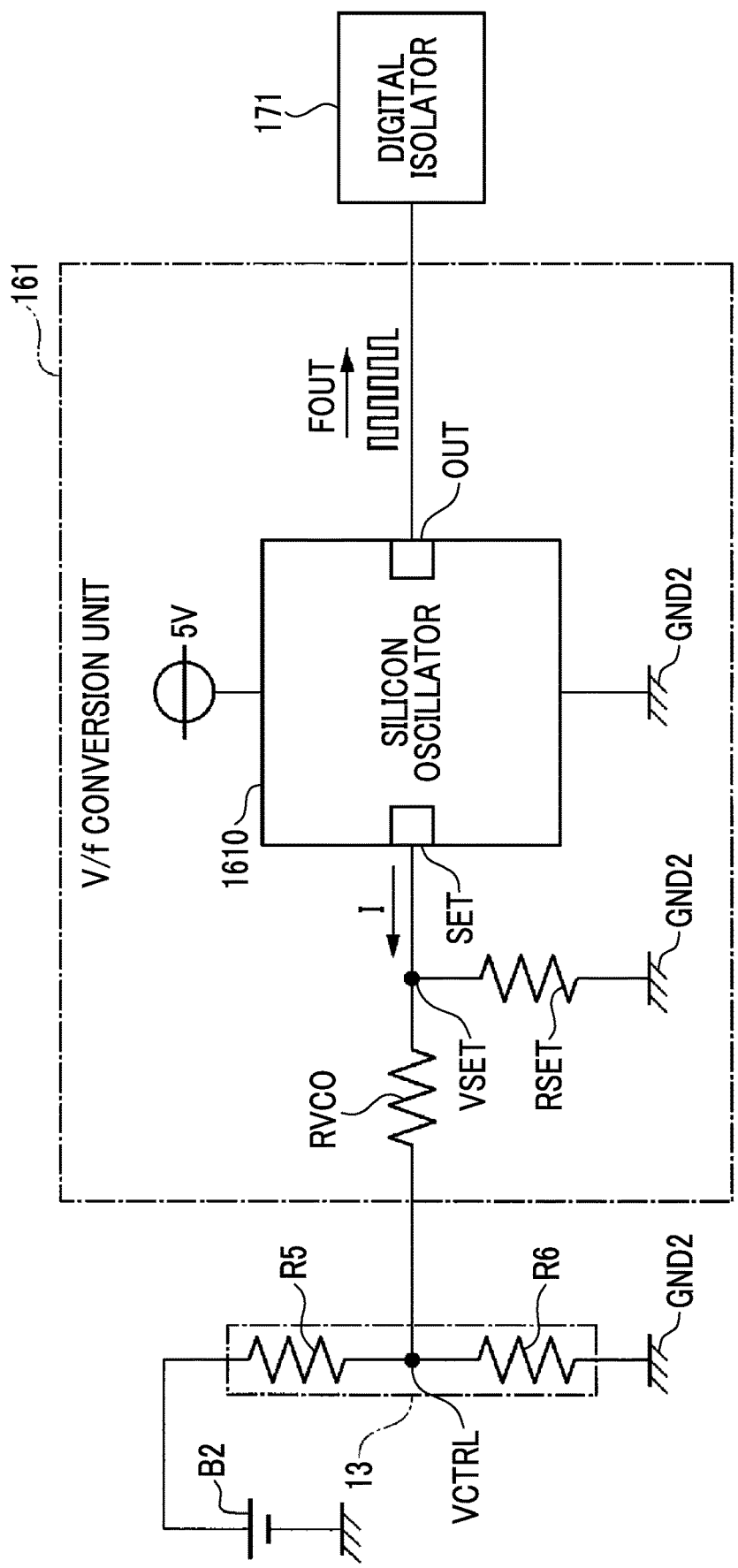
FIG. 4 is a second view showing the detailed circuit configuration of a V/f conversion unit according to the first embodiment.

FIG. 4 is a second view showing the detailed circuit configuration of the V/f conversion unit according to the first embodiment.

Figure 5:
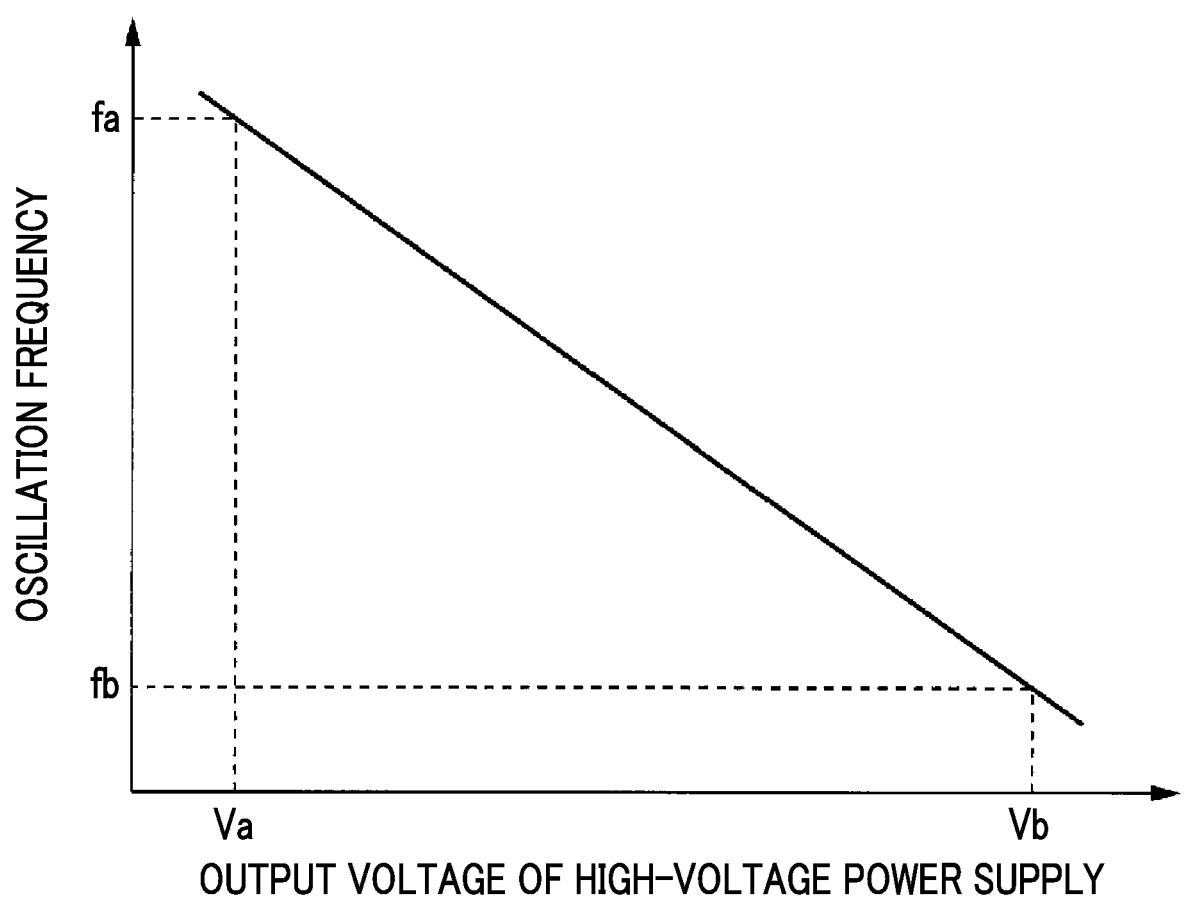
FIG. 5 is a second view illustrating a function of the V/f conversion unit according to the first embodiment.

FIG. 5 is a second view illustrating the function of the V/f conversion unit according to the first embodiment.

Hereinafter, the circuit configuration and the function of the V/f conversion unit 161 (a V/f conversion unit for high-voltage-side voltage detection) will be described in detail referring to FIGS. 4 and 5.

As shown in FIG. 4, the V/f conversion unit 161 has a silicon oscillator 1610 and resistive elements RVCO and RSET. The silicon oscillator 1610 is input with a power supply voltage DC 5 V based on the ground GND2 and is grounded to the ground GND2.

Similarly to the silicon oscillator 1620 shown in FIG. 2, the silicon oscillator 1610 has a setting terminal SET and an output terminal OUT. The setting terminal SET of the silicon oscillator 1610 allows a current I to flow such that a potential of a setting node VSET connected to the terminal is fixed at a predetermined value. Then, the output terminal OUT of the silicon oscillator 1610 outputs a frequency signal FOUT having a frequency according to a value of the current I flowing from the setting terminal SET.

The resistive element RVCO is connected between the setting node VSET and the output node VCTRL (an intermediate potential between the resistive element R5 and the resistive element R6 connected in series) from which the voltage signal (analog signal) according to the input voltage from the high-voltage battery B2 is output. The resistive element RSET is connected between the setting node VSET and the ground GND2.

According to the configuration described above, as shown in FIG. 5, for example, in a case where the input voltage from the high-voltage battery B2 is a relatively low voltage Va, the potential of the output node VCTRL of the high-voltage-side voltage sensor 13 is lowered. Thus, in order to maintain a predetermined potential on the setting node VSET, there is a need to allow a relatively large current I to flow from the setting terminal SET. Accordingly, in this case, the silicon oscillator 1610 outputs the frequency signal FOUT having a relatively high frequency fa from the output terminal OUT.

On the other hand, as shown in FIG. 5, in a case where the input voltage from the high-voltage battery B2 is a relatively high voltage Vb, the potential of the output node VCTRL of the high-voltage-side voltage sensor 13 is raised. Thus, in order to maintain a predetermined potential on the setting node VSET, there is a need to allow a relatively small current I to flow from the setting terminal SET. Accordingly, in this case, the silicon oscillator 1610 outputs the frequency signal FOUT having a relatively low frequency fb from the output, terminal OUT.

With the relationship shown in FIG. 5, the microcontroller 10 can ascertain the input voltage from the high-voltage battery B2 through an oscillation frequency of the frequency signal FOUT input by way of the digital isolator 171.

(Operations and Effects)

As described above, the vehicle-mounted air conditioner control device 1 according to the first embodiment includes the PTC heater H (heater element) that is connected to the high-voltage system circuit HV and generates heat by power supplied from the high-voltage battery B2, the microcontroller 10 that is connected to the low-voltage system circuit LV and controls electrical conduction from the high-voltage battery B2 to the PTC heater H, the current detection sensor 14 that is connected to the high-voltage system circuit HV and outputs the voltage signal corresponding to the value of the current flowing in the PTC heater H, the V/f conversion unit for current detection (V/f conversion unit 162) that is included in the high-voltage system circuit HV and converts the voltage signal output from the current detection sensor 14 into the frequency signal, and the digital isolator for current detection (digital isolator 172) that transmits the frequency signal to the microcontroller 10 while maintaining electrical insulation between the V/f conversion unit for current detection and the microcontroller 10.

With the configuration described above, the microcontroller 10 can acquire a current detection value (voltage signal) from the current detection sensor 14 included in the high-voltage system circuit HV through the V/f conversion unit 162 and the digital isolator 172 while belonging to the low-voltage system circuit LV. Accordingly, it is possible to sufficiently secure a withstand voltage between the low-voltage system circuit and the high-voltage system circuit while realizing electrical conduction control to the PTC heater H in the microcontroller 10.

A case where a microcontroller is provided in each of the high-voltage system circuit HV and the low-voltage system circuit LV, and communication (exchange of digital signal) between both microcontrollers is performed through the digital isolators is also considered. However, in this case, two microcontrollers need to be mounted in the vehicle-mounted air conditioner control device 1, causing an increase in cost.

Accordingly, with the above-described configuration according to the first embodiment, it is possible to suppress an increase in cost.

The V/f conversion unit 162 according to the first embodiment includes the silicon oscillator 1620 having the setting terminal SET and the output terminal OUT, and the like. The silicon oscillator 1620 outputs, from the output terminal OUT, the frequency signal having the frequency corresponding to the current output from the setting terminal SET.

With such a configuration, it is possible to convert the voltage signal into the frequency signal through the silicon oscillator 1620 that has a function capable of setting the oscillation frequency of the signal to be output as desired. With this, it is possible to configure the V/f conversion unit 162 at low cost.

The vehicle-mounted air conditioner control device 1 according to the first embodiment further includes, in the high-voltage system circuit HV, the high-voltage-side voltage sensor 13 that outputs the voltage signal according to the input voltage from the high-voltage battery B2, and the V/f conversion unit for high-voltage-side voltage detection (V/f conversion unit 161) that converts the voltage signal output from the high-voltage-side voltage sensor 13 into the frequency signal. In addition, the vehicle-mounted air conditioner control device 1 includes the digital isolator for high-voltage-side voltage detection (digital isolator 171) that transmits the frequency signal to the microcontroller 10 while maintaining electrical insulation between the V/f conversion unit for high-voltage-side voltage detection and the microcontroller 10.

In this way, the microcontroller 10 disposed in the low-voltage system circuit LV can monitor the input voltage from the high-voltage battery B2 through the V/f conversion unit 161 and the digital isolator 171. With this, the microcontroller 10 can detect an abnormality for the high-voltage battery B2 as well as the low-voltage battery B1.

Second Embodiment

Hereinafter, a vehicle-mounted air conditioner control device according to a second embodiment will be described referring to FIG. 6.

Figure 6:
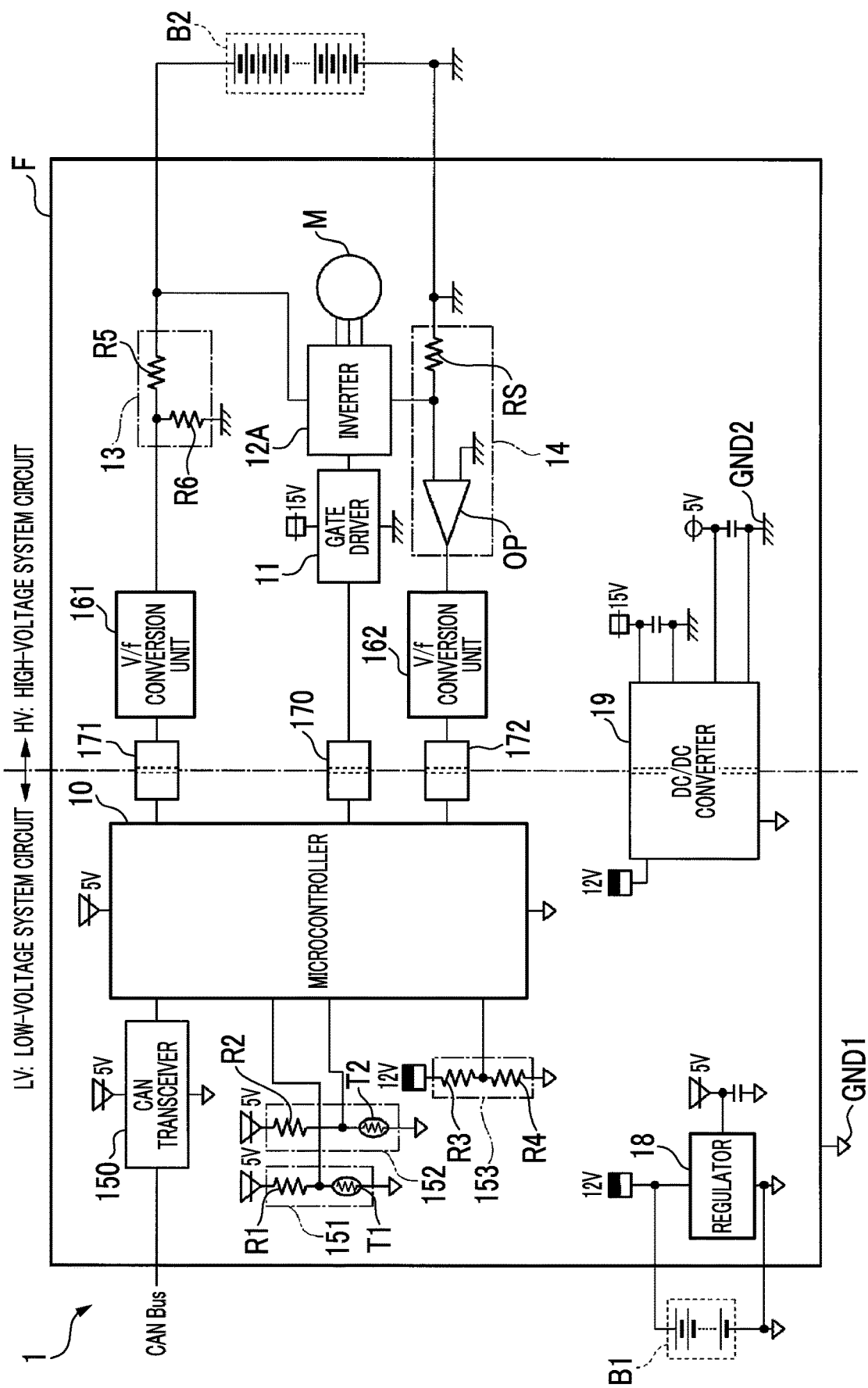
FIG. 6 is a diagram showing the overall configuration of a vehicle-mounted air conditioner control device according to a second embodiment.

A vehicle-mounted air conditioner control device 1 shown in FIG. 6 is an air conditioner control device that is mounted in a vehicle, such as an electric vehicle or a hybrid vehicle. The vehicle-mounted air conditioner control device 1 drives an inverter 12A and a motor M and rotates a compressor for air conditioning through electrical conduction from the high-voltage battery B2 mounted in an electric vehicle, a hybrid vehicle, or the like.

The inverter 12A is a power conversion circuit having a plurality (for example, six) of switching elements (IGBT or the like) and converts direct-current power to three-phase alternating-current power for driving the motor M.

In this case, the current detection sensor 14 functions as a current detection sensor that outputs a voltage signal indicating a value of a current flowing in the motor M.

The microcontroller 10 performs control while monitoring the current (motor current) flowing in the motor M in compliance with a command from a higher-level device.

The specific configurations of the V/f conversion units 161 and 162 and the like are the same as those in the first embodiment.

As described above, although several embodiments of the invention have been described above, the embodiments are presented as only examples, and thus, are not intended to limit the scope of the invention. The above-described embodiments can be carried out in other various forms, and various omissions, replacements, and alterations may be made within the scope without departing from the spirit of the invention. The above-described embodiments and modification examples thereof are included in the inventions disclosed in the claims and equivalents thereof as included in the scope and the spirit of the invention.

INDUSTRIAL APPLICABILITY

With the vehicle-mounted air conditioner control device and the vehicle described above, it is possible to sufficiently secure a withstand voltage between the low-voltage system circuit and the high-voltage system circuit.

REFERENCE SIGNS LIST

1: vehicle-mounted air conditioner control device
10: microcontroller
11: gate driver
12: switching element
12A: inverter
13: high-voltage-side voltage sensor
14: current detection sensor
150: CAN transceiver
151: inlet-side water temperature sensor
152: outlet-side water temperature sensor
153: low-voltage-side voltage sensor
161, 162: V/f conversion unit
1610, 1620: silicon oscillator
170, 171, 172: digital isolator
18: regulator
19: DC/DC converter
H: PTC heater
R1, R2, R3, R4, R5, R6, R7, R8, R9, R10, R11, RS, RVCO, RSET: resistive element
C: capacitive element
OP: amplifier
T1, T2: temperature sensor element
F: housing frame
B1: low-voltage battery
B2: high-voltage battery
M: motor

The invention claimed is:

1. A vehicle-mounted air conditioner control device comprising:
   a heater element that is included in a high-voltage system circuit and generates heat by power supplied from a high-voltage battery;
   a microcontroller that is included in a low-voltage system circuit and controls the power supplied from the high-voltage battery to the heater element;
   a current detection sensor that is included in the high-voltage system circuit and outputs a voltage signal indicating a value of a current flowing in the heater element;
   a V/f conversion unit for current detection that is included in the high-voltage system circuit and converts the voltage signal output from the current detection sensor into a frequency signal; and
   a digital isolator for current detection that transmits the frequency signal to the microcontroller while maintaining electrical insulation between the V/f conversion unit for current detection and the microcontroller.

2. The vehicle-mounted air conditioner control device according to claim 1,
   wherein the V/f conversion unit for current detection includes
   a silicon oscillator having a setting terminal and an output terminal, and
   the silicon oscillator outputs, from the output terminal, the frequency signal having a frequency corresponding to a current output from the setting terminal.

3. The vehicle-mounted air conditioner control device according to claim 2, further comprising:
   a high-voltage-side voltage sensor that is included in the high-voltage system circuit and outputs a voltage signal according to an input voltage from the high-voltage battery;
   a V/f conversion unit for high-voltage-side voltage detection that is included in the high-voltage system circuit and converts the voltage signal output from the high-voltage-side voltage sensor into a frequency signal; and
   a digital isolator for high-voltage-side voltage detection that transmits the frequency signal to the microcontroller while maintaining electrical insulation between the V/f conversion unit for high-voltage-side voltage detection and the microcontroller.

4. A vehicle comprising:
   the vehicle-mounted air conditioner control device according to claim 2.

5. The vehicle-mounted air conditioner control device according to claim 1, further comprising:
   a high-voltage-side voltage sensor that is included in the high-voltage system circuit and outputs a voltage signal according to an input voltage from the high-voltage battery;
   a V/f conversion unit for high-voltage-side voltage detection that is included in the high-voltage system circuit and converts the voltage signal output from the high-voltage-side voltage sensor into a frequency signal; and
   a digital isolator for high-voltage-side voltage detection that transmits the frequency signal to the microcontroller while maintaining electrical insulation between the V/f conversion unit for high-voltage-side voltage detection and the microcontroller.

6. A vehicle comprising:
   the vehicle-mounted air conditioner control device according to claim 5.

7. A vehicle comprising:
   the vehicle-mounted air conditioner control device according to claim 1.

8. A vehicle-mounted air conditioner control device comprising:
   a motor that is included in a high-voltage system circuit and is driven with power supplied front a high-voltage battery;
   a microcontroller that is included in a low-voltage system circuit and controls the power supplied from the high-voltage battery to the motor;
   a current detection sensor that is included in the high-voltage system circuit and outputs a voltage signal indicating a value of a current flowing in the motor;
   a V/f conversion unit for current detection that is included in the high-voltage system circuit and converts the voltage signal output from the current detection sensor into a frequency signal; and
   a digital isolator for current detection that transmits the frequency signal to the microcontroller while maintaining electrical insulation between the V/f conversion unit for current detection and the microcontroller.

9. A vehicle comprising:
   the vehicle-mounted air conditioner control device according to claim 8.

* * * * *